United States Patent [19]

Miyata

[11] 4,203,499
[45] May 20, 1980

[54] APPARATUS FOR PREVENTING OR DAMPING VIBRATIONS AND NOISE IN A VEHICLE

[75] Inventor: Koji Miyata, Kariya, Japan

[73] Assignee: Toyota Shatai Kabushiki Kaisha, Aichi, Japan

[21] Appl. No.: 864,774

[22] Filed: Dec. 27, 1977

[30] Foreign Application Priority Data

Dec. 27, 1976 [JP] Japan .................................. 51/159882
Jan. 26, 1977 [JP] Japan ..................................... 52/8155
Jan. 28, 1977 [JP] Japan ..................................... 52/8917

[51] Int. Cl.² ............................................. B62D 25/00
[52] U.S. Cl. ................................ 180/89.12; 180/312; 296/35.1
[58] Field of Search ................... 296/28 C, 35 R; 180/89.12, 89.14, 89.15, , 89.16, 64 R

[56] References Cited

U.S. PATENT DOCUMENTS

| 3,380,773 | 4/1968 | Sewelin | 296/28 C |
| 3,554,596 | 1/1971 | LeFevre | 296/28 C |
| 3,762,671 | 10/1973 | Schulz | 180/64 R |
| 3,768,856 | 10/1973 | Stuller | 296/28 C |

FOREIGN PATENT DOCUMENTS

| 1924101 | 11/1970 | Fed. Rep. of Germany | 180/64 R |
| 689283 | 4/1965 | Italy | 296/35 R |
| 1392574 | 4/1975 | United Kingdom | 180/89.14 |

Primary Examiner—David M. Mitchell
Attorney, Agent, or Firm—Oblon, Fisher, Spivak, McClelland & Maier

[57] ABSTRACT

An apparatus for preventing or damping vibrations and noise in a vehicle, in which the vibration-transmitting characteristics of two or more mount units in an engine mounting member and/or a body mounting member of a vehicle are changed relatively, so that the vibrations or sounds produced due to vibrations which have been transmitted from an engine via mount units to a vehicle body may be off-set or mutually counteracted, thereby damping or preventing vibrations and noise in a vehicle body.

8 Claims, 18 Drawing Figures

APPARATUS FOR PREVENTING OR DAMPING VIBRATIONS AND NOISE IN A VEHICLE

BACKGROUND OF THE INVENTION

1. Field of the Invention

This invention relates to a method for preventing or damping vibrations and noise in a vehicle, particularly in an automobile.

2. Description of the Prior Art

The vibrations or noise in a vehicle is one of the major factors which impair comfortable riding in a vehicle. In general, the rotation of an engine or vibrations of a vehicle during its running are transmitted to a vehicle body and then vibrate the walls of a vehicle body, resulting in the generation of noise in the passenger compartment in the vehicle. Many attempts have been proposed to overcome the vibration and noise problems experienced with a motor vehicle. It is known that the noise or sound may be damped to a considerable extent according to the vibration-damping action of vibration-proof materials or buffer materials, such as a rubber cushion, insulator and the like, which are used in respective appropriate portions of a vehicle. These include engine mounts, body mounts and suspension systems. However, the sound-damping or insulating actions of these vibration-proof materials are dependent upon their individual sound-damping or insulating effects alone. In addition, many attempts have been proposed to improve the characteristics of individual vibration-proof materials as well as to increase the number of vibration-proof materials. However, the resulting sound-insulating or damping effects of these vibration-proof materials remain only no more than the sum of the individual effects of these vibration-proof materials.

Meanwhile, difficulties have been confronted with the concept of improvements in individual vibration-proof materials, and in addition, the use of an increased number of vibration-proof materials is not desirable from viewpoints of drivability and stability of a vehicle, thus resulting in only a partial success in damping or insulating sound or noise.

SUMMARY OF THE INVENTION

It is an object of the present invention to provide a method for preventing or damping vibrations and noise experienced with a vehicle, which is dependent on the sound-insulating effects of individual vibration-proof materials, but provides a novel method to attain the dampening of vibrations and noise.

The present invention is based on the following discoveries that, since known body mounting members and engine mounting members are generally of a symmetric structure, vibrations are transmitted from the tires and engine via left-and right-hand mount units to a vehicle body at the same phase, so that the vibrations may cause resonance.

According to the present invention, for preventing or damping vibrations and noise in a vehicle, mount units having different vibration transmitting characteristics from each other are disposed between the cab or the engine and the chassis.

In this case, the vibration transmitting characteristics of each of the mount units is determined due to the dynamic characteristics such as the damping coefficient, spring constant and the like of the connecting member comprised therein and dynamic characteristics of the connecting member is changed by varying the orientation, inclination, material, size, shape and the like thereof.

For example, when the vibrations of the chassis are transmitted to the cab through the mount units of the present invention, since the vibration transmitting characteristics of each of the mount units is different from each other, the phase of vibrations passing each of the mount units having different transmitting characteristics becomes different from each other. However, in this case, the frequency of the vibrations of the chassis is not varied even after the vibrations of the chassis are transmitted through the mount units.

Thus, only the phase of the vibrations transmitted to the cab is changed to be different for each of the mount units according to the different transmitting characteristics thereof.

As a result, in the cab, vibrations from one mount unit interfere with those from another mount unit, of which phase is delayed from that of vibrations from one mount unit by the phase difference therebetween, to neutralize or counteract the vibrations from each of the shock mounts without augumenting them.

BRIEF DESCRIPTION OF THE DRAWINGS

Various other objects, features and attendant advantages of the present invention will be more fully appreciated as the same becomes better understood by reference to the following detailed description when considered in connection with the accompanying drawings in which like reference numerals designate like or corresponding parts throughout the several views, and wherein.

DETAILED DESCRIPTION OF THE PREFERRED EMBODIMENTS

A first embodiment of the present invention will now be described in greater detail with reference to FIGS. 1–8 which indicate the first embodiment of the invention by way of an example of left-hand and right-hand rear mount units in a cab-mounting member of a tilting cab-over type automobile.

Figure 1:
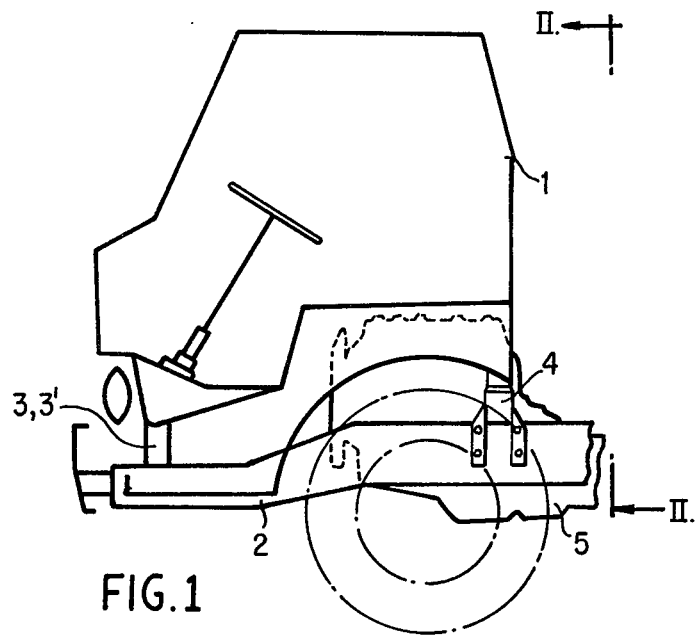
FIG. 1 is an elevational view of a first embodiment of the present invention.
Figure 2:
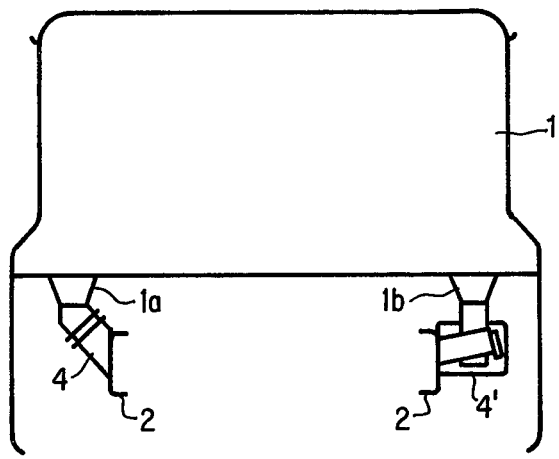
FIG. 2 is a partial cross-sectional view taken along line II—II of FIG. 1.

FIG. 1 shows a cab-mounting member and method of mounting a cab-over type automobile. As shown, the front ends of a cab 1 are supported by a pair of symmetric front mount units 3, 3' which are disposed on the left- and right-hand front ends of a vehicle chassis 2, while the rear ends of the cab 1 are supported by a pair of non-symmetric rear mount units 4, 4' disposed on the left and right-hand frames of the chassis 2 of a vehicle in a vibration-proofing manner with vehicle engine 5 being disposed below cab 1 and mounted to vehicle chassis 2.

More particularly, vibration-proof rubbers of a bush type typical of front mount units for a tilting type cab are used in symmetric relation as the front mount unit 3, 3', while shear type mount units of non-symmetric structure as shown in FIGS. 2 to 5 are used as rear mount units 4, 4'.

Figure 3:
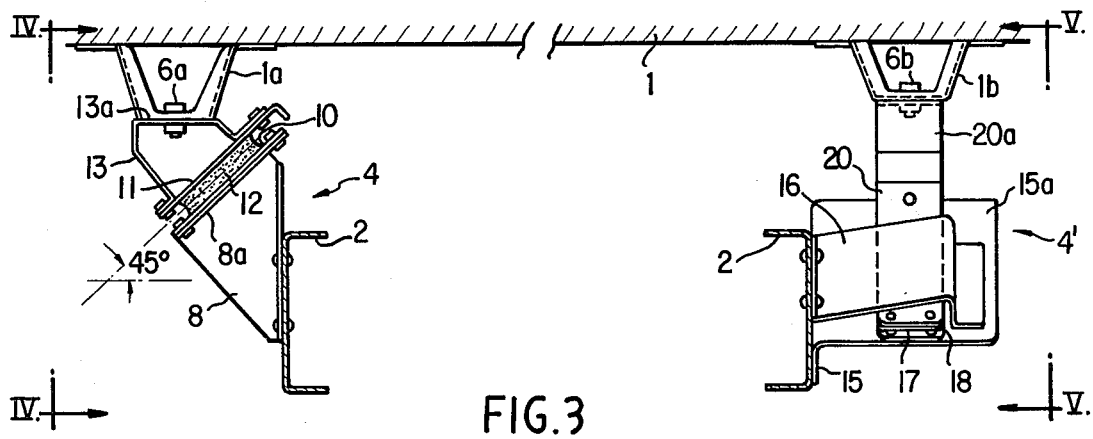
FIG. 3 is an elevational view of rear mount units of the embodiment of FIG. 1.
Figure 4:
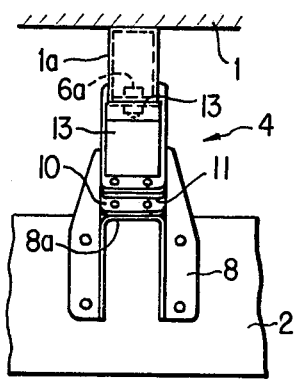
FIG. 4 is a view taken along line IV—IV of FIG. 3.

Detailed description will be given of the construction of the shear type mount units hereinafter. As shown in FIGS. 3 and 4, a mount bracket 8 secured to the left-hand side surface of the chasis 2 is formed with an inclined surface 8a having an inclination 45° to the horizontal and extending perpendicular ot the vertical plane as viewed in the width or lateral direction of a vehicle. Secured to the inclined surface 8a by means of bolt and nut members is a lower attaching plate 10, while vibration-proof rubber 12 is sandwiched between and bonded to two parallel attaching plates 10, 11 according to vulcanization. On the other hand, an upper bracket 13 is secured to the upper attaching plate 11 by means of bolt and nut members. A bracket 1a projecting from a cab 1 at the rear end thereof leftwards and downwards is secured to the top surface 13a of upper bracket 13 by means of bolt and nut members 6a.

Figure 5:
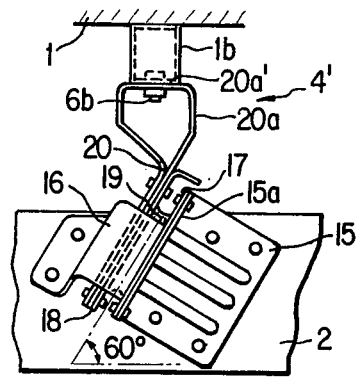
FIG. 5 is a view taken along line V—V of FIG. 3.

As shown in FIG. 3 and FIG. 5, a mount bracket 15 in the right-hand rear mount unit 4' is formed with an inclined surface 15a having an inclination of 60° to the horizontal and extending perpendicular to the vertical plane of a vehicle as viewed in the longitudinal direction. In this respect, mount bracket 15 is secured to the right-hand side surface of the chasis 2. In addition, one end of a sub-bracket 16 is secured to the right-hand surface of the chasis 2 for reinforcing the bracket 15. The other end of sub-bracket 16 is secured to the inclined surface 15a of mount bracket 15. As in the case where the vibration-proof rubber 12 is sandwiched between and bonded to the two attaching plates 10, 11 in the left-hand rear mount unit 4, a vibration-proof rubber 19 is integrally bonded to and sandwiched between two parallel attaching plate 17, 18, beforehand. Attaching plate 17 is then secured to inclined surface 15a of mount bracket 15 by means of bolt and nut members. Meanwhile, an upper bracket 20 is prepared by forming a piece of a metallic plate into a substantially square cross-sectional shape by folding the same, thereby providing a seat portion 20a. The upper bracket 20 thus formed is secured to the attaching plate 18 by means of bolt and nut members. In addition, a bracket 1b projecting from the cab 1 at the rear end thereof rightwards and downwards is secured to a horizontal top surface 20a' of the seat portion 20a of the upper bracket 20, while the upper bracket 20 and bracket 1b on the cab 1 are fastened together by means of bolts 6b.

With the left and right-hand rear mount units 4, 4' of the aforesaid arrangement, the vibration-proof rubber 12 in the left-hand mount unit 4 is identical in construction to the vibration-proof rubber 19 in the right-hand rear mount 4', except that the left-hand rear mount unit 4 and right-hand rear mount unit 4' are secured to the inclined surfaces 8a, 15a which extend in the different directions, so that the different actions of the mount units 4, 4' may be achieved.

Figure 6:
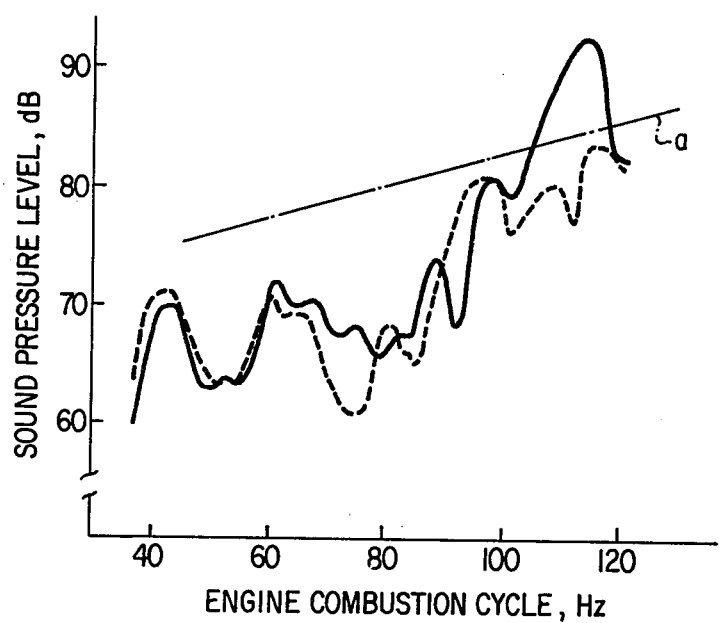
FIGS. 6 and 7 show operational characteristics of the embodiment of FIG. 1 as compared to prior art.
Figure 7:
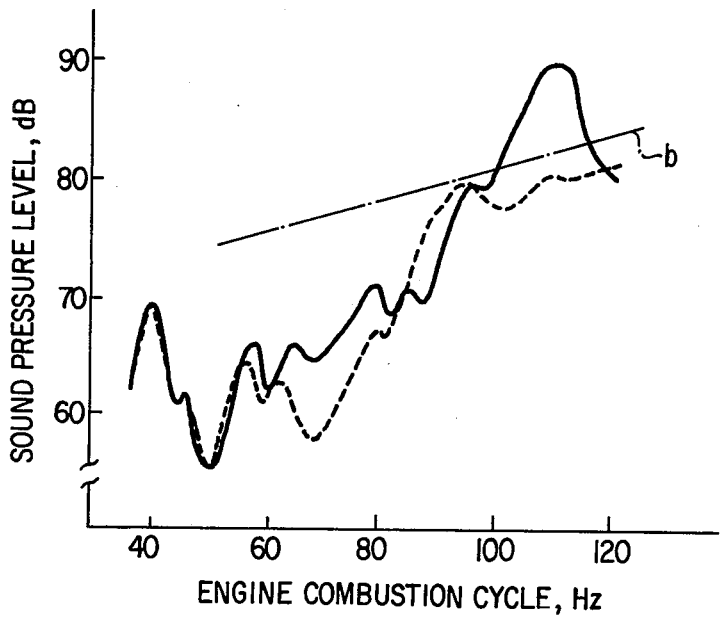

Considering then the sound preventing or damping action of the cab-mounting means in the embodiment described, FIGS. 6 and 7 compare the test results given to compartment noise in the cab 1 due to vibrations of an engine, between the cab-mounting members and method according to the invention and the cab-mounting members and methods of the prior art. FIG. 6 refers to noise levels at the time of acceleration of an engine, while FIG. 7 refers to noise levels at the time of deceleration of an engine. In this respect, the noise level was measured at the position of the driver's ears at his seat.

Figure 8:
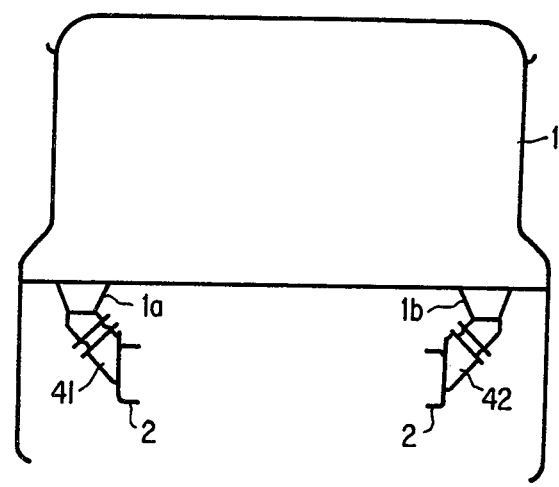
FIG. 8 illustrates conventional mounting units.

According to the prior art cab mounting members, which have been adopted as a comparative example to this embodiment of the invention, the left-hand rear mount unit 41 as shown in FIG. 8 is identical in construction to the leaf-hand rear mount unit 4 in the embodiment of the invention, while the right-hand rear mount unit 42 is symmetric to the left-hand rear mount unit 41.

As shown in FIG. 6, according to the prior art example (solid line), the sound pressure level is maintained substantially constant up to an engine combustion cycle of 80 Hz. However, when the engine combustion cycle exceeds 80 Hz, then the sound pressure level is increased sharply. When the engine combustion cycle reaches 115 Hz, then the sound pressure level reaches a peak. Thereafter, the sound pressure level is decreased sharply, up to an engine combustion cycle of 120 Hz.

On the other hand, according to the embodiment of the invention (broken line), the same sound pressure level as that of the prior art example is maintained up to an engine combustion cycle of about 100 Hz, while the sound pressure level is shown considerably lower than the prior art sound level when an engine combustion cycle exceeds 100 Hz. FIG. 7 shows a tendency similar to that of FIG. 6.

The sound pressure level shown in FIGS. 6 and 7 contains an air propagating sound and the like of an engine to some extent. However, the sound pressure level in this case may be regarded as the sound pressure alone, which results when the vibrations of an engine are transmitted from a chasis via mount units to the cab. Meanwhile, the noise in a compartment in a vehicle does not always stem from an engine, but includes various kinds of noises produced in respective portions of a vehicle. As shown in FIGS. 6 and 7, even if the vibrations and sounds of an engine are present all the time, in case the level of the sound and vibrations are relatively low as compared with other sounds and vibrations then the sounds are not recognized as noise. On the other hand, if the levels of sound and vibrations of an engine becomes higher than that of the other sound and vibrations, then they are recognized as noise. In FIGS. 6 and 7, the approximate sound pressure levels of other noises are shown by line a and line b, respectively. According to the prior art, uncomfortable vibrations and noise result when an engine combustion cycle is from 100 Hz to 120 Hz. In this respect, according to this first embodiment of the invention, the sound level achieved is lower than the lines a and b. This demonstrates that the cab mounting members and method according to the present first embodiment provides marked improvements in the sound preventing or damping effect over that of the prior art mounting members and methods.

The sound preventing or damping effect of the first embodiment of the invention stems from a non-symmetric arrangement of the left- and right-hand rear mount units 4, 4', as has been described earlier.

Stated differently, the vibration-proof rubber 12 as used in the left-hand rear mount unit 4 is identical in construction to the vibration proof rubber 19 as used in the right-hand rear mount unit 4'. However, due to the arrangement of the vibration proof rubbers 12, 19 positioned in the different directions, the vibration proof rubber 12, i.e., the rear mount unit 4, exhibits a dynamic characteristic, such as damping coefficient, spring constant and the like, which is different from that of the vibration-proof rubber 19, i.e., the rear mount unit 4', in every direction of the vehicle. As a result, the rear mount unit 4 exhibits a vibration transmitting characteristic different from that of the rear mount unit 4' in every position of a vehicle.

Thus, when the vibrations are transmitted from an engine via chasis 2 to the left- and right-hand rear mount units 4, 4' having different vibration-transmitting characteristics, then the vibrations are transmitted via respective rear mount units 4, 4' to the cab 1. In this respect, however, the vibrations are subjected to changes in phase and amplitude commensurate to the vibration transmitting characteristics of the rear mount units 4, 4'. The vibrations transmitted via rear mount units 4, 4' to the cab 1 cause interference with each other. In other words, the walls of the cab 1 are vibrated by the vibrations thus transmitted and then vibrate air inside a compartment. The phase difference in this case, for instance, should be 90° to 270°. Due to this arrangement, the vibrations or sound transmitted from both sides cause interference, thereby minimizing vibrations of walls of the cab 1 or air therein, with an improved sound or noise proofing effect.

A second embodiment of the present invention will be described in detail with reference to FIGS. 9–13 in which the present invention is applied to engine mounting members and corresponding method of a cab-over type automobile.

Figure 9:
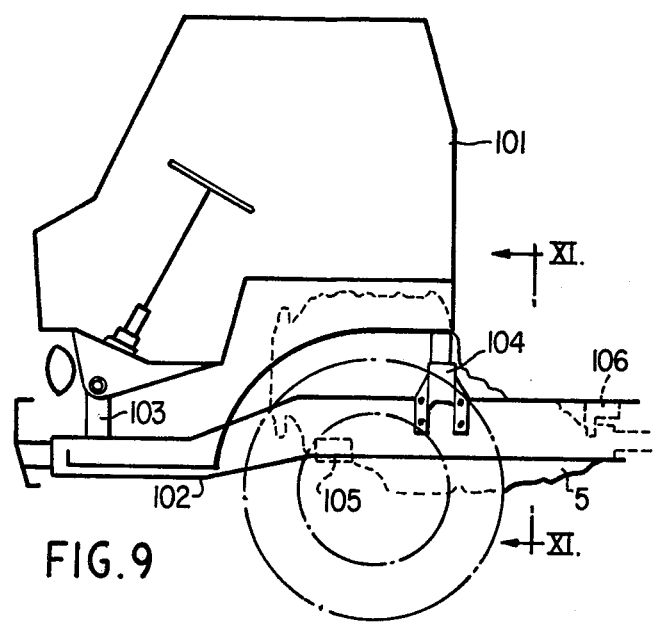
FIG. 9 is a elevational view of a second embodiment of the present invention.
Figure 10:
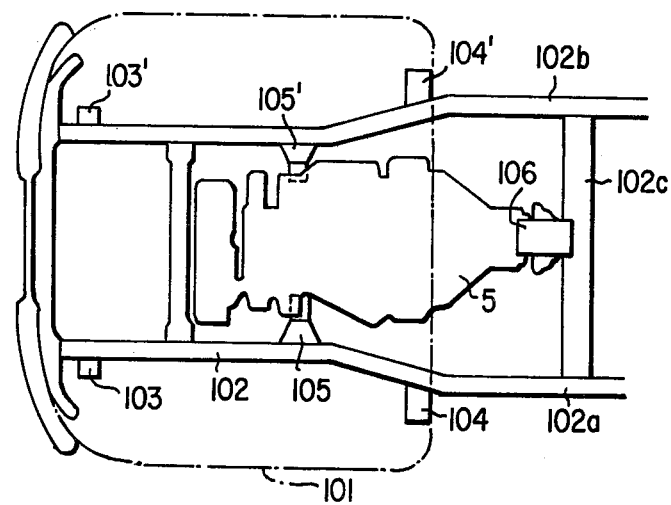
FIG. 10 is a bottom view of the embodiment of FIG. 9.

As shown in FIGS. 9 and 10, according to the cab-over type automobile, an engine 5 is mounted on a chasis 102 below the driver's seat of the cab 101. In this respect, the front portion of the engine 5 is supported by front mount units 103, 103' projecting inwardly from left and right-hand side frames 102a, 102b of the chasis 102, while the rear portion of the engine 5 is supported by the rear mount unit 106 projecting from a cross member 102c of the chasis 102 in a vibration-proofing manner. In other words, the engine 5 is supported at three points, i.e., by the mount units 105, 105', and 106 while the rear portion of the cab 101 through the medium of left and right-hand rear mount units 104 and 104' in a vibration-proofing manner.

Figure 11:
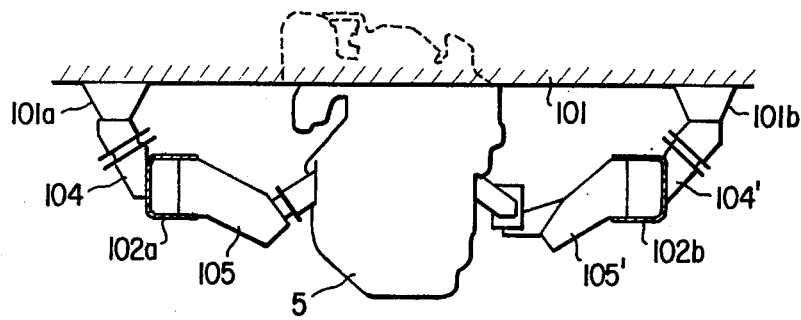
FIG. 11 is a partial cross-sectional view taken along line XI—XI of FIG. 9.
Figure 12:
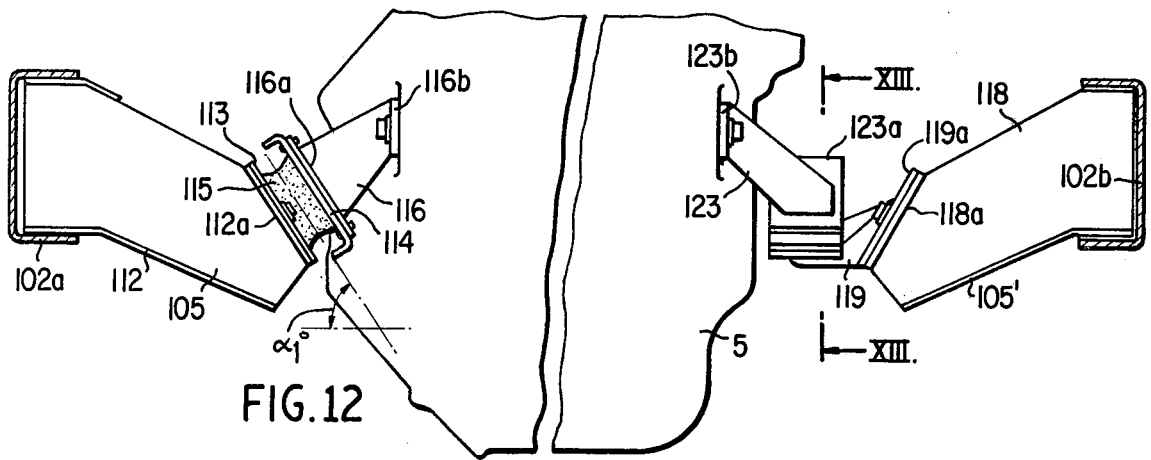
FIG. 12 is a elevated view of the engine support structure set forth in FIG. 11.
Figure 13:
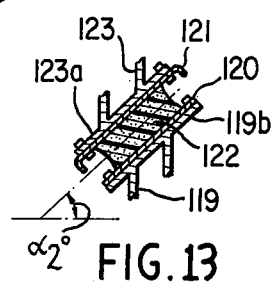
FIG. 13 is a cross-sectional view taken along line XIII—XIII of FIG. 12.

The left-hand and right-hand front mount units 105, 105' are non-symmetric in construction. FIGS. 11–13 show the detailed arrangement of the front mount units 105, 105'. The arrangement of the left-hand front mount unit 105 is particularly shown in FIGS. 11 and 12. A mount bracket 112 is secured at its one end to the inner side surface of a left-hand side frame 102a of the chasis 102. The mount bracket 112 is formed with a seat surface 112a perpendicular to the vertrical plane as viewed in the lateral or width direction of the vehicle at an inclination of $\alpha_1°$ to the horizontal. A vibration proof rubber 115 is sandwiched between and bonded to two parallel attaching plates 113, 114 according to the vulcanization. Then, the attaching plate 113 is secured to the seat surface 112a of the mount bracket 112 by means of bolt and nut members, while a seat surface 116b of an upper bracket 116 having another seat surface 116b is secured to the other attaching plate 114 by means of bolt and nut members, while the other seat surface 116 is secured to the engine 5.

The right-hand front mount unit 105' is particularly shown in FIGS. 11 to 13. One end of a mount bracket 118 which is symmetric to the mount bracket 112 in the left-hand front mount unit 105 is secured to the inner side surface of the right-hand side frame 102b of the chasis 102. A seat surface 119a of a coupling member 119 having another seat surface 119b extending in the different direction is secured to the other seat surface 118a of the mount bracket 118 by means of bolt and nut members. The other seat surface 119b of the coupling member 119 thus arranged to extend perpendicular to the vertical plane as viewed in the longitudinal direction of a vehicle at an inclination of $\alpha_2°$ to the horizontal.

As in the case of the left-hand mount bracket 105, a vibration proof rubber 122 is sandwiched between and bonded to two parallel attaching plates 120, 121 which are spaced a given distance from each other. The attaching plate 120 is then secured to the seat surface 119b of the coupling member 119 by means of bolt and nut members, while a seat surface 123a of an upper bracket 123 having another seat surface 123b extending in the different direction is secured to the other attaching plate 121 by means of bolt and nut members. The other seat surface 123b is secured to the engine 5. Meanwhile, the construction of the attaching plates 120, 121 having vibration-proof rubber 122 bonded therebetween is identical to that in the left-hand front mount 105.

As has been described, the vibration proof rubber 115 in the left-hand front mount unit 105 is secured to the seat surface 112a of the mount bracket 112 in the left-hand front mount unit 105, while the vibration proof rubber 122 in the right-hand front mount unit 105' is secured to the seat surface 119b of the coupling member 119 in the right-hand front mount unit 105' in a different direction. As a result, the left and right hand mount unit 105 and 105' exhibit different vibration-transmitting characteristics.

Accordingly, when the engine 5 is run, the vibrations from the engine 5 are transmitted from the engine mounting members via chasis 102 and cab mounting members to the cab 101. In this respect, the vibrations from the engine 5 are subjected to a change in phase due to the different vibration-transmitting characteristics of the left- and right-hand front mount units 105 and 105'.

More particularly, the vibrations transmitted from the engine 5 via the left-hand front mount unit 105 to the chasis 102, as well as the vibrations transmitted from the engine 5 via the right-hand front mount unit 105' to the chasis 102 are both transmitted via cab-mounting members to the cab 101, thereby vibrating the walls of a compartment of the cab 101, and in turn vibrating air therein. In this respect, the vibrations transmitted from the left-hand front mount unit 105 and the vibrations transmitted from the right-hand front mount unit 105' cause interference during the transmission of vibrations through the walls of the compartment in the cab 101 or during the propagation of vibrations through the air therein, due to a difference in phase of the vibrations, which difference has been caused by means of the left and right-hand mount units 105, 105'. As a result, the vibrations from both sides do not augment but counteract each other, thereby offsetting their actions. Accordingly, the vibrations of walls of a compartment as well as the vibrations of air may be minimized, so that vibrations and noise in the compartment may be damped or prevented.

Figure 14:
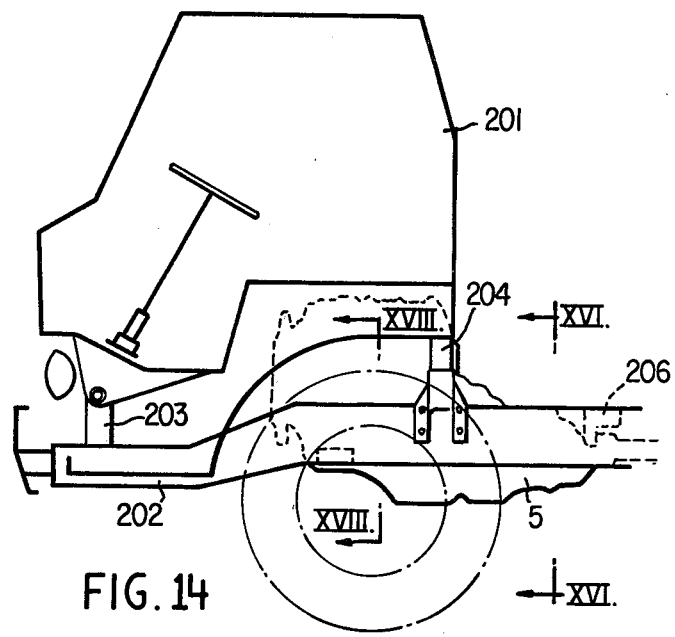
FIG. 14 is an elevational view of a third embodiment of the present invention.
Figure 15:
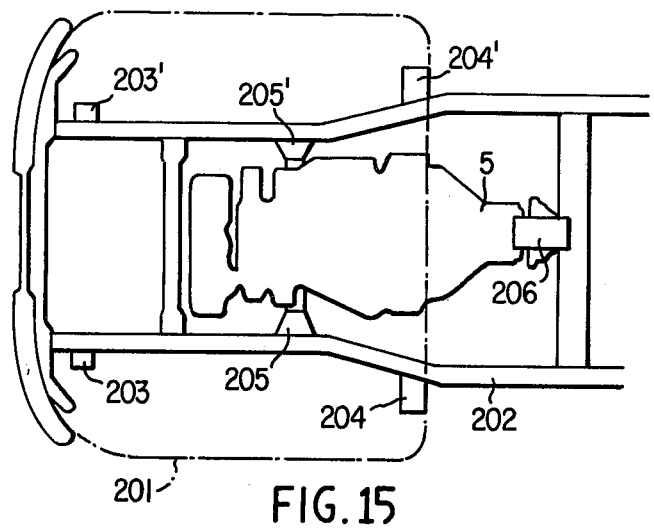
FIG.15 is a bottom view of the embodiment of FIG. 14.
Figure 16:
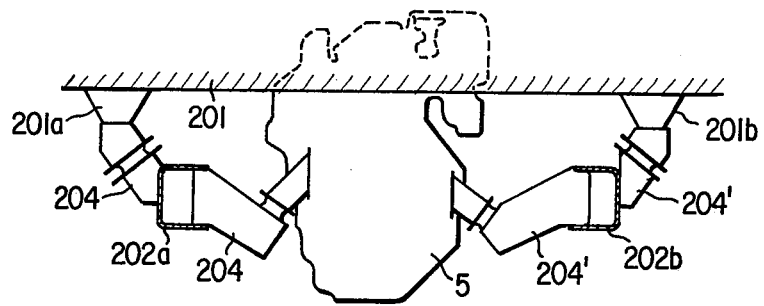
FIG. 16 is a view taken along line XVI—XVI of FIG. 14.

A third embodiment of the present invention will now be described in detail with reference to FIGS. 14-18 in which the present invention is applied to a cab-over type automobile. FIGS. 14 and 15 show a cab-over type automobile similar to that of FIG. 9 but are numbered in a 200 series. As shown, the front portion of the cab 201 is supported on a chasis 202 through the medium of left and right-hand front mount units 203, 203', while the rear portion of the cab 201 is supported on the chasis 202 through the medium of left- and right-hand rear mount units 204, 204' in a vibration proofing manner. An engine 5 is provided on the chasis 202 below a driver's seat in the cab 201. The front portion of the engine 5 is supported on the chasis 202 in a vibration-proofing manner through the medium of left and right-hand front mount units 205, 205' while the rear portion of the engine 5 is supported on the chasis 202 in a like manner through the medium of a rear mount unit 206.

Figure 17:
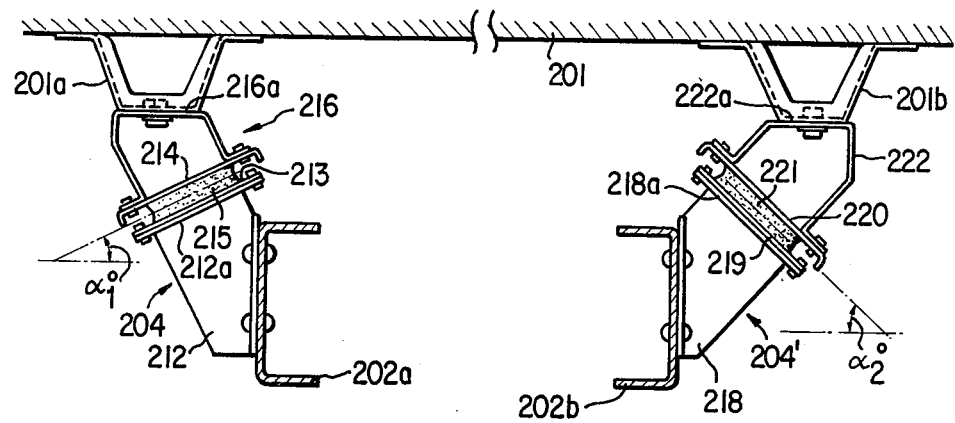
FIG. 17 is a detailed view of the cab support structure set forth in FIG. 16.

Meanwhile, the left and right-hand front mount units 203, 203' in the cab mounting means are identical, and include bush-type, vibration-proof members so as to allow for the tilting of the cab 201. The left and right-hand rear mount units 204, 204' are non-symmetric in construction, which is best shown in FIG. 17.

According to the left-hand rear mount unit 204, a mount bracket 212 is secured, at one end, to the outer side surface of a left-hand side frame 202a of the chasis 202. The mount bracket 212 is formed with a seat surface 212a at the other end, which surface 212a extends perpendicular to the vertical plane as viewed in the width or lateral direction of a vehicle, at an inclination $\alpha_1°$ to the horizontal. A vibration proof rubber 215 is sandwiched between and bonded to the two parallel attaching plates 213, 214 which are spaced a distance from each other, according to the vulcanization. The attaching plate 213 is secured to the seat surface 212a of the mount bracket 212 by means of screw members, while an inverted hat-shaped upper bracket 216 is secured to the other attaching plate 214 by means of screw members. A leg bracket 201a projecting from the rear end of the cab 201 leftwards and downwardly is secured to the horizontal seat surface 216a formed on the top surface of the upper bracket 216 by means of bolt and nut members.

The right-hand rear mount unit 204' is similar in construction to the left-hand rear mount unit 204. A mount bracket 218 is secured, at its one end, to the other side surface of a right-hand side frame 202b of the chasis 202. The mount bracket 18 is formed, at the other end, with a seat surface 218a extending perpendicular to the vertical plane as viewed in the width or lateral direction of a vehicle at an inclination $\alpha_2°$ to the horizontal. A vibration proof rubber 221 is sandwiched between and bonded to two parallel attaching plates 219, 220 which are spaced a distance from each other, according to the vulcanization. This arrangement is similar to that of the attaching plates 213, 214 having vibration proof rubber 215 sandwiched therebetween and bonded thereto. The attaching plate 219 is secured to the seat surface 218a of the mount bracket 218 by means of screw members, while the lower end of the upper bracket 212 is secured to the other attaching plate 230. A leg bracket 201b projecting from the rear end of the cab 201 downwards and rightwardly is mounted on the horizontal seat 222a on the top surface of the upper bracket 222, so that the leg bracket 201b is secured to the upper bracket 222 by means of bolt and nut members.

Figure 18:
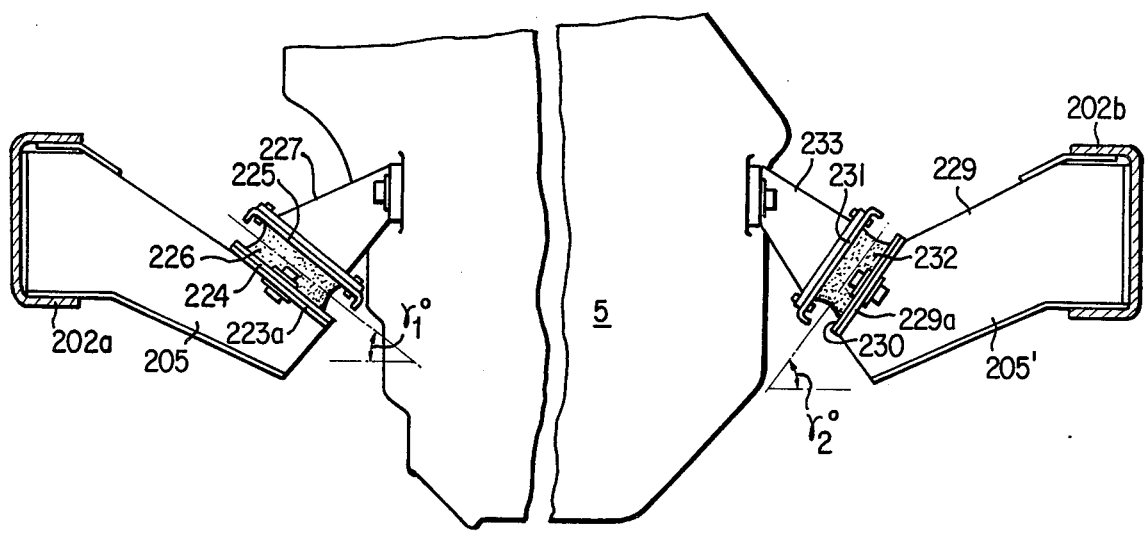
FIG. 18 is a detailed view of the engine support structure set forth in FIG. 16.

The rear mount unit 206 in the engine mounting means is of a suspension type. FIG. 18 shows a detailed construction of the left and right-hand front mount units 205, 205' which are of different shapes.

Referring to the left-hand front mount unit 205, a mount bracket 223 is secured to the inner side of the left-hand side frame 202a of the chasis 202 at one end. The mount bracket 222 is formed with a seat surface 223a on its top surface projecting from the mount bracket 223 downwardly aslant. The seat surface 223a extends perpendicular to the vertical plane as viewed in the width or lateral direction of a vehicle at an inclination $\gamma_1°$ to the horizontal. A vibration proof rubber 226 is sandwiched between and bonded to two parallel attaching plates 224, 225 which are spaced a distance from each other, according to vulcanization, as in the case of the cab-mounting members.

The right-hand front mount unit 205' is substantially the same as that of the left-hand front mount unit 205. A mount bracket 229 is secured at its one end to the inner side surface of the right-hand side frame 202b on the chasis 202. The mount bracket 229 is formed with a seat surface 229a on the top surface of the mount bracket, which projects therefrom aslant downwardly at the other end thereof. The seat surface 229a extends perpendicular to the vertical plane as viewed in the width or lateral direction of the vehicle, at an inclination $\gamma_2°$ to the horizontal. Like the case of the two attaching plates 224, 225 having the vibration proof rubber 226 sandwiched therebetween in the left-hand front mount unit 205, a vibration proof rubber 232 is sandwiched between and bonded to two parallel attaching plates 230, 231 according to vulcanization. The attaching plate 230 is secured to the seat surface 229a of the mount bracket 229 by means of screw members, while the lower end of an upper bracket 233 is secured to the other attaching plate 31 by means of screw members. The other end of the upper bracket 233 is secured to the engine 5 by means of bolt nut members.

With this embodiment, the vibration-proof rubbers 215, 221 of the same configuration are used in the left and right-hand cab mount units 204, 204' in the cab mounting members. An attaching angle of the vibration proof rubber 215 is $\alpha_1°$, while an attaching angle of the vibration proof rubber 221 is $\alpha_2°$ ($\alpha_1° < \alpha_2°$), with the result that the vibration proof rubber 215 is different in dynamic characteristics such as damping coefficient, spring constant and the like, for the other vibration-proof rubber 221. As a result, the mount units 204, 204' exhibit different vibration-transmitting characteristics. The vibration proof rubbers 226, 232 in the left and right-hand front mount units 205, 205' in the engine mounting members are identical. In this respect, the vibration proof rubber 226 is attached at an angle $\gamma_1°$ to the horizontal, while the other vibration proof rubber 232 is attached at an angle of $\gamma_2°$ ($\gamma_1° > \gamma_2°$) so that the left and right-hand front mount units 205, 205' in the engine mounting members exhibit different vibration transmitting characteristics, as in case of the left and right-hand rear mount units 204, 204' in the cab mounting members.

Accordingly, when the engine 5 is run, the vibrations of engine 5 are transmitted to the chasis 202 through the engine mounting members. However, the phases of the vibrations of the engine 5 are subjected to different phase delays due to the different vibration transmitting characteristics of the left and right-hand front mount units 205, 205' so that the vibrations having different delays are transmitted to the left and right-hand side frames 202a, 202b of the chasis 202, respectively. More particularly, the vibrations transmitted from the left-hand front mount unit 205 to the left-hand side frame 202a of the chasis 202 are then transmitted via the left-hand side frame 202a to the left-hand rear mount unit 204 in the cab mounting member, while the vibrations transmitted via the right-hand front mount unit 205' to the right-hand side frame 202b are then transmitted via the right-hand side frame 202b to the right-hand rear mount unit 204' in the cab mounting members. Thus, these vibrations are subjected to the different phase delays due to the different vibration transmitting characteristics of the left- and right-hand rear mount units 204,204' so that there results a difference in phase between the vibrations transmitted from the left-hand rear mount unit 205 to the cab 201 and the vibrations transmitted from the right-hand rear mount unit 205' to the cab 201. As a result, the vibrations transmitted to the wall of a compartment in the cab and air therein cause interference or counteract each other, thereby off-setting their actions. Thus, the vibrations of the alls of a compartment and air therein may be minimized, with the resulting damping of noise.

As is apparent from the foregoing description, the vibration transmitting characteristics of the left and right-hand rear mount units 204, 204' in the body mounting members as well as the left and right-hand front mount units 205, 205' in the engine mounting members are changed relatively, thereby creating a phase difference in the vibrations. Thus, the vibrations cause interference rather than augment each other.

The aforesaid third embodiment of the invention has been applied to the rotational vibrations of an engine, which vibrations are transmitted via the left and right-hand rear mount units 204, 204' in the cab mounting means to the cab 201. However, the present invention is by no means limited to these instances, but to the engine vibrations to be transmitted via the mount units other than the body mounting members. In addition, the present invention may be applied to part or all mount units in both engine mounting members and body mounting members, i.e., left and right-hand rear mount units 204, 204' in the cab mounting members; left and right-hand front mount units 203, 203'; or front mount unit 203, 203' and rear mount units 204, 204' or all of these mount units. Furthermore, the present invention may be applied to the engine mounting member, i.e., the left and right-hand front mount units 205, 205' and front mount units and rear mount unit 206; or left and right-hand rear mount units in the engine mounting members having four mounting points.

With the foregoing embodiments of the invention, the same kind of vibration proof rubbers are used for the left and right-hand mount units, and the inclination and angles thereof are changed for the purpose of changing the vibration-transmitting characteristics of the mount units. Alternatively, vibration proof rubbers made of different materials, or having different dimensions and shapes may be employed in place of the vibration proof rubbers as used in the embodiments of the invention.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for preventing or damping vibrations and noise in a vehicle body, which comprises:
   a vehicle chassis;
   at least one pair of laterally spaced mounting units for supporting said vehicle body on said vehicle chassis, which are disposed on opposed sides of the vehicle centerline, each of said at least one pair of mounting units being composed of two bracket members to be fixed to said vehicle body and said vehicle chassis; and
   connecting means connecting said two bracket members through a vibration proofing material, said connecting means of each said at least one pair of mounting units exhibiting different dynamic characteristics from each other, said connecting means further causing the phases of vibrations transmitted from said vehicle chassis through said at least one pair of mounting units to become different from each other and causing vibrations transmitted through said at least one pair of mounting units to interfere with each other to prevent or dampen vibrations and noise in the vehicle body.

2. An apparatus for preventing or damping vibrations and noise in a vehicle body according to claim 1, wherein:
   said at least one pair of mounting units comprises first and second mounting units for supporting a cab of said vehicle body on said vehicle chassis.

3. An apparatus for preventing or damping vibrations and noise in a vehicle body according to claim 2, wherein:
   said at least one pair of mounting units further comprises third and fourth mounting units for supporting an engine of said vehicle body on said vehicle chassis.

4. An apparatus for preventing or damping vibrations and noise in a vehicle body according to claim 1, wherein:
   said connecting means of said at least one pair of mounting units are asymmetrically disposed with respect to the vehicle centerline.

5. An apparatus for preventing or damping vibrations and noise in a vehicle body according to claim 4, wherein:
   said connecting means of said at least one pair of mounting units are connected to said bracket members at different inclination angles from each other with respect to the horizontal plane of said vehicle.

6. An apparatus for preventing or damping vibrations and noise in a vehicle body according to claim 4, wherein:

said connecting means of said at least one pair of mounting units are fixed to said vehicle body and said vehicle chassis through said bracket members so as to extend in asymmetrical directions with each other.

7. An apparatus for preventing or damping vibrations and noise in vehicle body according to claim 4, wherein: said connecting means of said at least one pair of mounting units have different dimensions and shapes from each other.

8. An apparatus for preventing or damping vibrations and noise in a vehicle body according to claim 1, wherein: said connecting means of said at least one pair of mounting units comprise different vibration proofing material from each other.

* * * * *